Figure 1:
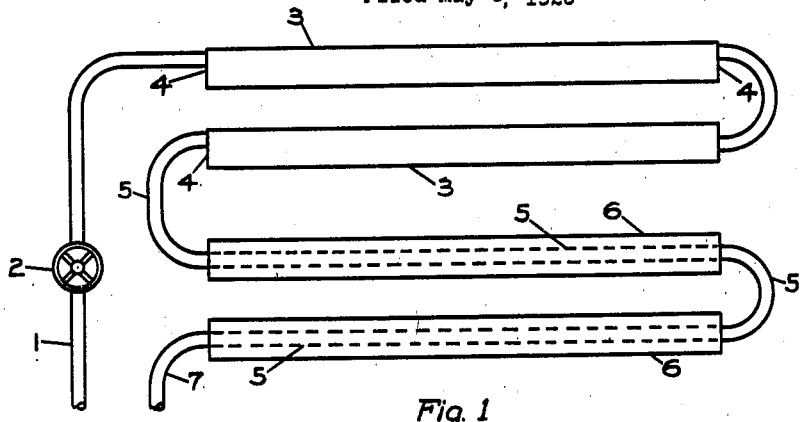

Dec. 15, 1931.  B. C. SHIPMAN  1,836,090
REFRIGERATING SYSTEM
Filed May 6, 1925   3 Sheets-Sheet 1

Inventor
Bennet Carroll Shipman

Dec. 15, 1931.    B. C. SHIPMAN    1,836,090
REFRIGERATING SYSTEM
Filed May 6, 1925    3 Sheets-Sheet 3

Inventor
Bennet Carroll Shipman

Patented Dec. 15, 1931

1,836,090

UNITED STATES PATENT OFFICE

BENNET CARROLL SHIPMAN, OF SAN FRANCISCO, CALIFORNIA

REFRIGERATING SYSTEM

Application filed May 6, 1925. Serial No. 28,327.

In cases where it is desired to maintain frosted pipe continuously in atmosphere above 32° F. during periods of time when the refrigerating plant may be shut down, it has heretofore been necessary to install a brine tank with a pump and motor, or other motive power, to pump the chilled brine continuously through the pipes to be kept frosted, the refrigerating plant being operated only so long as may be necessary to keep the brine at a suitable temperature. This system, known as the brine system, is objectionable for several reasons: it costs more to install than the corresponding direct expansion system; it costs more to operate than the direct expansion system; and it involves more losses than the direct expansion system. It costs more because more apparatus is required, and usually additional cork covered lines are required; it costs more to operate, because a lower ammonia, or other refrigerant, temperature, and therefore pressure, is required in order to deliver the same temperature to the frosted pipe, and further because there is a continuous consumption of power required to operate the brine pump in addition to the refrigerating power proper; and finally more heat losses are involved because two brine lines are required where only one cold refrigerant line usually is necessary, and the heat loss of the pump is incurred.

The one objection to direct expansion is that the refrigeration and therefore the frost ceases as soon as the refrigerating plant ceases operation. My invention overcomes this difficulty and still retains the advantages of direct expansion. To accomplish this I provide traps, or dams, in each pipe in which it is desired to retain refrigeration during a periodic shut down of the refrigerating plant, and to make said pipes of such a capacity as to hold sufficient liquid refrigerant distributively throughout such pipes to provide refrigeration during the required shut down period. I then also provide in the same or another insulated cold storage space piping of suitable capacity subject to a temperature lower than the temperature surrounding the pipes in which it is desired to retain refrigeration. This secondary, or condensing piping may be located in a freezing room, or similar space, but in practice it is preferable to locate it in a brine tank or tube, which may also serve some other normal purpose, such as for ice tank, hold over room storage, etc. The secondary or condensing piping forms with the primary or evaporating piping a complete section embracing both sets of piping, and capable of being normally isolated from the rest of the system when the operation of the refrigerating plant ceases. Thus when the refrigerating plant ceases operation, and the temperature of the liquid trapped in the dammed pipes starts to rise, it begins to evaporate, thus producing refrigeration, and passes over as gas to the secondary piping, where due the colder surrounding temperature, it condenses. This action will continue as long as there is liquid left in the primary piping and as long as the temperature surrounding the secondary piping remains below that of the primary piping. In practice there is no difficulty in maintaining a very live frost on pipes over a period of eight hours of shut down and more. If brine tanks or tubes are used to house the secondary piping, it is preferable that they be supplied with brine of such density that the normal operation of the plant will congeal a relatively large percentage of such brine, inasmuch as the heat absorbing capacity of a given amount of brine will be tremendously increased over the equivalent amount of liquid brine, and thus maintain the action desired for a much longer period of time.

Figure 2:
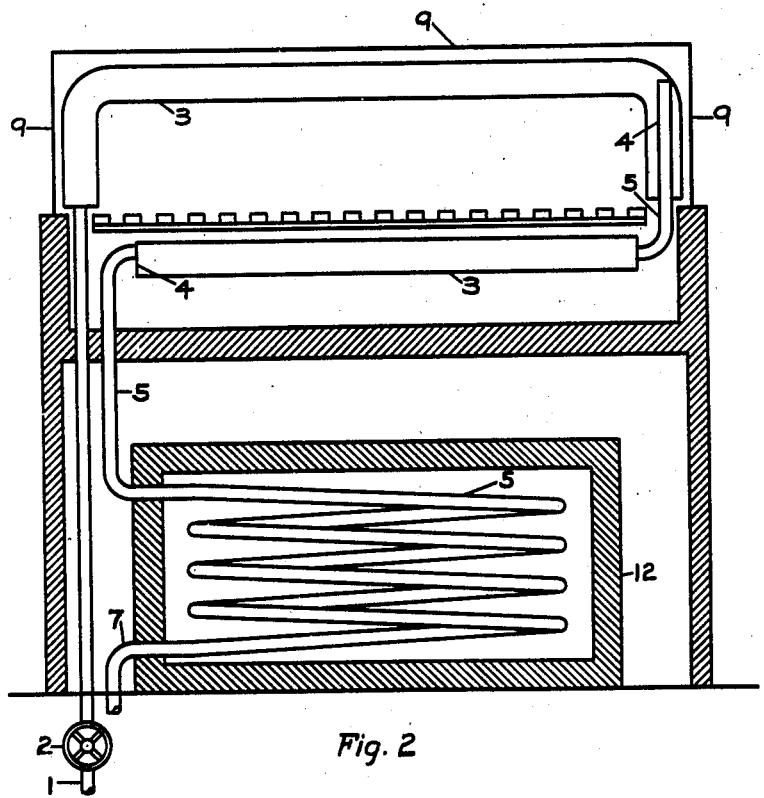
Figure 3:
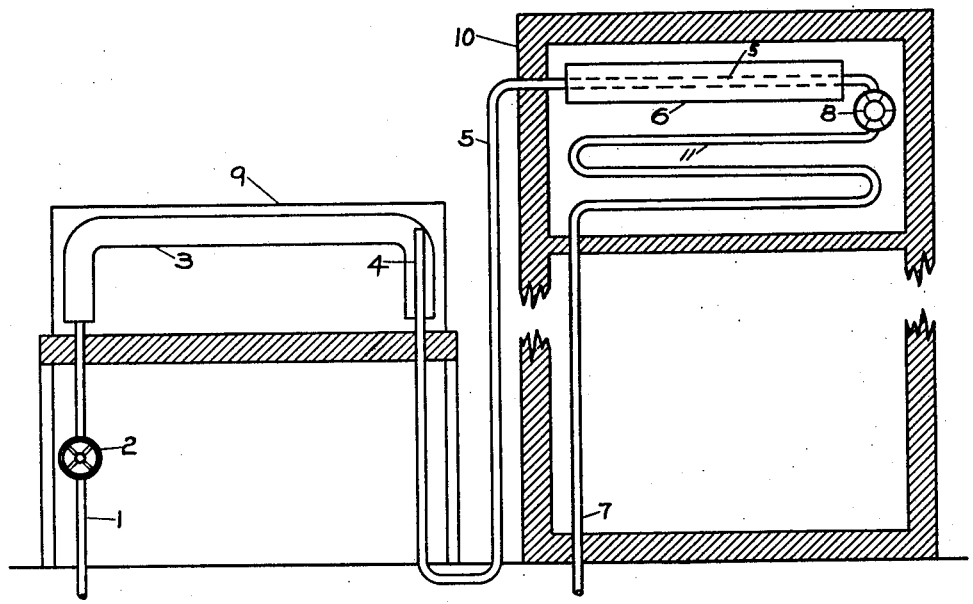
Figure 4:
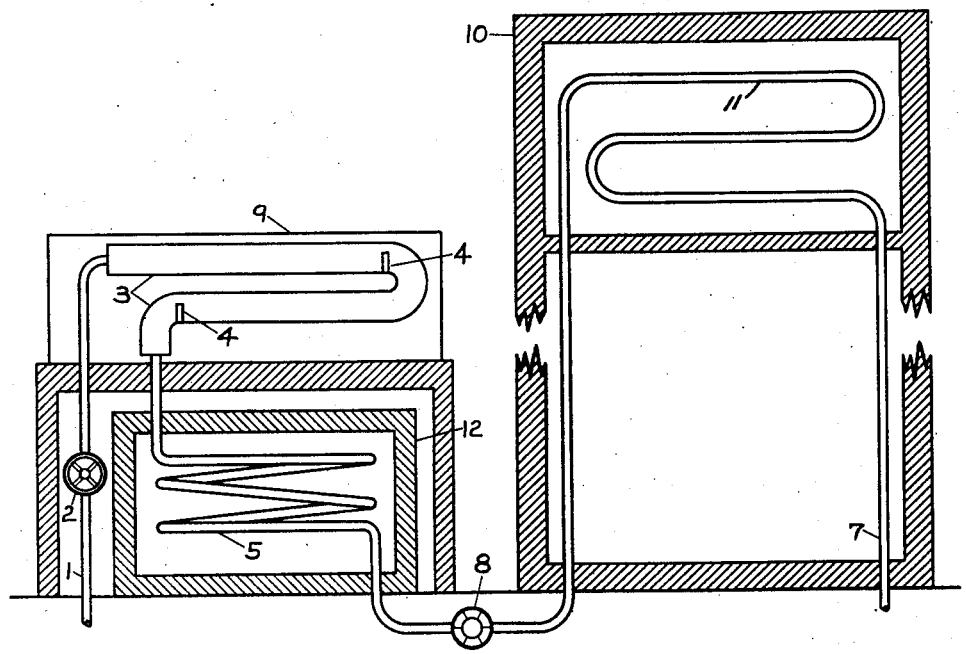
Figure 5:
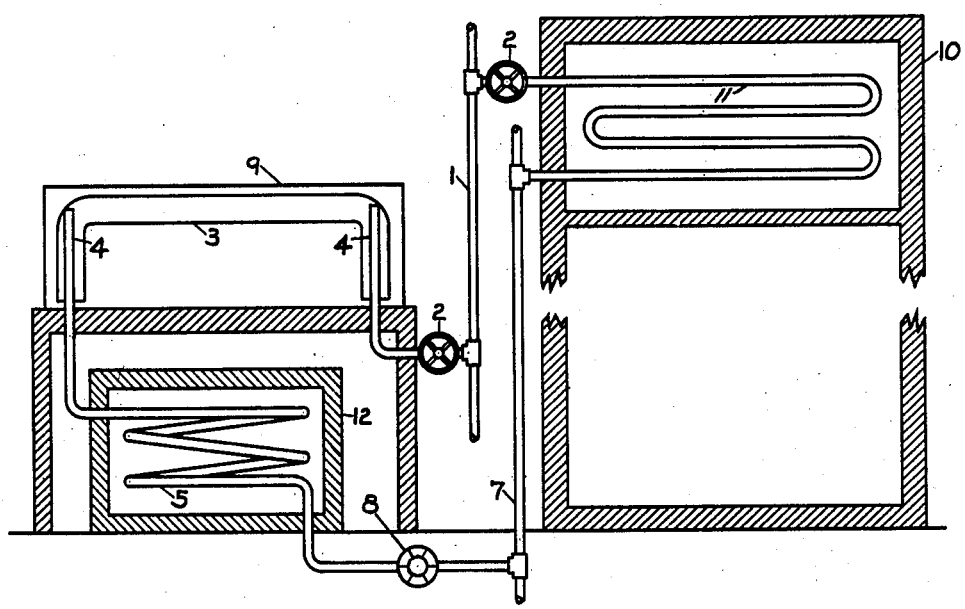
Figure 6:
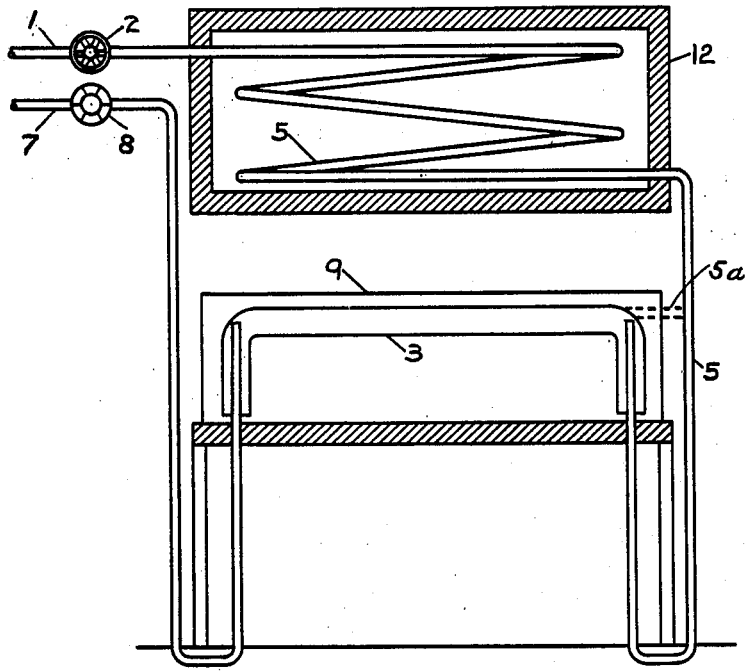

Referring to the drawings, the figures illustrate only so much of a refrigerating system as my invention concerns, and are applicable to any type of refrigerating plant, it being understood that the balance of the system requires no change or modification, whether it be of the compressive type or the absorption type. Anyone familiar with the art can readily apply my invention to any system. Fig. 1 illustrates a two pipe coil, for instance in the upper part of a show case, which it is desired to maintain frosted; Fig. 2 illustrates a slightly different type of coil in the extreme top of a show case and which must be prevented from thawing and dripping on the goods below; Fig. 3 illustrates the same type of coil as Fig. 2 but connected in a circuit with a separate cold storage fixture, in which the brine tube, or tank, is located, which cold storage fixture may be considered typical of any number of such fixtures; Fig. 4 illustrates a combination of Figs. 2 and 3, with a type of coil illustrated in Fig. 1; Fig. 5 illustrates more fully my invention in connection with multiple distribution, wherein the show case and cold storage fixture may be indefinitely multiplied by simply connecting them similarly to the liquid and suction lines shown; and Fig. 6 illustrates a special application referred to below in the detailed explanation. In each case the coils or evaporators connected between the refrigerant inlet and outlet constitute sections of the evaporating system, whether comprising two separate portions, namely primary and secondary coils, or one portion only as indicated by 11, where in Fig. 3 the series type of distribution is illustrated, or in Fig. 5 the multiple type is indicated.

Referring to the drawings, 1 is a liquid refrigerant line of an operating refrigerating system; 2 is an expansion valve of any type either manually or automatically operated; 3 is a pipe or pipes to be maintained frosted, or in a refrigerated condition for some predetermined period; 4 are dams, or traps, in said pipes, 3, so made as to accumulate and retain the requisite amount of liquid in said pipes distributively throughout the said pipes while being fed from the expansion valve, 2; 5 is the expansion line connecting the pipes, 3, to other expansion coils or to the suction line, 7; 6 is a brine tube or tubes, or tank, through which the expansion line, 5, passes, and is filled with brine preferably of the proper density to freeze at a temperature corresponding to the normal operating suction pressure of the system; this brine receptacle may be placed either before or after the pipes, 3, and in Fig. 6 is shown connected ahead of such pipes; 7 is the return suction line to the suction line of the system; 8 is a check valve making a non-return valve between that part of the system embracing the coil, 3, and the brine receptacle, 6, and the balance of the system connected thereto whether in series or in multiple; 9 is the glass of a show case; 10 is a refrigerator box or cold storage room; 11 are the coils in such refrigerator; and 12 is a separate brine tank well insulated.

Fig. 1 illustrates that type of show case of which both the top and bottom are refrigerated, the top coils, 3, being visible and to be continuously frosted, and the brine tubes, 6, being between the upper and lower sections of said show case, and not visible. When the refrigerating plant is in operation, the proper opening of the expansion valve, 2, will allow liquid refrigerant to enter the pipes, 3, preferably, as shown, at the top, and so fill the first pipe to the height of the dam, 4, then the second pipe similarly, excess liquid passing on through pipe 5, and chilling, or preferably congealing, the brine in the tubes, 6, and refrigerating the lower part of the case also. The resulting evaporated gas passes out suction line, 7, on its way back to the compressor or absorber not shown. When the plant is shut down and the expansion valve, 2, shut off, liquid will continue to evaporate in coils 3, because the resulting gas will be condensed in pipes, 5, maintained at a lower temperature than said coils, 3, by the brine in tubes, 6. Suitable proportions can be made for any given conditions to provide sufficient liquid in pipes, 3, sufficient space in pipes, 5, to condense all the gas evaporated from the liquid in pipes, 3, and sufficient brine in tubes, 6, to absorb all the heat released by the condensation of said gas, for some predetermined period of time corresponding to the shut down period of the plant. This arrangement is especially applicable to automatically controlled plants, where a regular cycle of operations automatically take place, but can be equally well used on hand controlled plants with equally good results provided the design is adequate for the desired shut down period. Thus frost can be maintained on pipes, 3, when the refrigerating plant is not in operation, by direct expansion, without the use of any auxiliary machinery, and at the normal operating pressure and efficiency of the plant.

Fig. 2 shows a different arrangement of pipe 3. In addition to the coils illustrated in Fig. 1, it is often desired to make a loop or loops up to the extreme top of the case, or perhaps to form some figure or name with the pipe. In such a case some of the vertical risers would not remain frosted if only dams, such as illustrated in Fig. 1, were used, as liquid would not be maintained in them. Then a construction similar to that shown in Fig. 2 is preferable, wherein the inlet pipe, 3 in certain cases, and the suction outlet pipe, 5, are carried from the bottom of the riser to the requisite height to maintain the necessary level of liquid in the horizontal section. In Fig. 2 also is shown a brine tank, 12, outside and distinct from the show case 9, but which acts in every way as do the brine tubes, 6, in Fig. 1.

Ordinarily more fixtures are connected to a system than shown in Figs. 1 and 2. Fig. 3 shows one modification in which the condensing brine tube, 6, or brine tank, is located in another fixture, illustrated as a cold storage box, 10. In such a case, this brine tube or tank, when the plant might be shut down, could not only condense gas arising from the pipes, 3, but also that arising from the coils in the same box, 11, and thus exhaust the heat absorbing capacity of the brine before the plant was started in operation again. Therefore the combination of pipes, 3, with the brine tubes, 6, or brine tank, 12, must be isolated from the balance of the system as soon as the plant is shut down and the flow of liquid stopped. For this purpose I provide check valve, 8, which serves to prevent any gas from reaching and condensing in pipes, 5, from any part of the system except pipes, 3. One section in this case is the coils comprised between the admission valve, 2, and the check valve, 8, and the other section is the coils, 11.

My invention is equally applicable to multiple connections of expansion coils or to series connections. Multiple connections are shown in Fig. 5, only two fixtures being shown, but any number of others could be attached in the same manner to the liquid and suction mains shown. The check valve, 8, serves the same purpose as above described.

In certain cases, where only a small amount of pipe is used in brine tubes or tank, the gas condensed in pipes, 5, together with what liquid might remain from normal operation, would fill pipes, 5, before all the liquid in pipes, 3, was evaporated, or before the shut down period had terminated. An arrangement illustrated in Fig. 6 will prevent this result and effectually continue the refrigeration in pipes, 3, as long as the temperature surrounding pipes, 5, whether in brine or in another colder room, shall remain below that of the pipes, 3. This is accomplished by placing the pipes, 5, together with their accompanying brine receptacle if any, at a higher elevation than the pipe to be maintained refrigerated, and arranging the pipes, 5, so that they will drain back down into the pipes, 3. The connection can be made direct, as shown dotted avoiding any trap, or may pass down below the floor and then up again, providing only that the condensing pipes, 5, are higher than evaporating pipes, 3. With the arrangement of Fig. 6 which also illustrates the expansion valve feeding the brine tank first and the evaporating coils, 3, last, any gas evaporating from coil, 3, after the refrigerating plant is shut down, and condensing in pipes, 5, will immediately drain back into coil, 3, to be again evaporated, repeating in this manner until the temperature surrounding pipes, 5, is as high as the temperature of coils, 3, or until the refrigerating plant again starts in operation.

It is evident that in certain types of irregular construction, such as, for instance, pipes bent into the form of names, devices, etc., it is not practicable to place dams at regular intervals as in horizontal runs of pipe, but in such cases a retaining dam or structures may be so placed in a vessel or element of the low side connected to said irregular pipes as to maintain a supply of liquid in such pipes and to allow the escape of the gas formed by evaporation therefrom into said dammed or obstructed element.

I do not limit myself to the particular constructions shown herein, for it is evident that others could easily be devised to serve the same purpose, but I claim any means of maintaining an adequate supply of liquid refrigerant in any one portion of a section or part of the evaporating system of a refrigerating plant in conjunction with another portion of the same section or part of said evaporating system maintained at a lower temperature than the first mentioned portion of a section.

I claim:

1. In a refrigerating system, the combination of a plurality of evaporating sections, means for retaining liquid refrigerant distributively throughout a given portion of an evaporating section, means for condensing the gaseous refrigerant arising therefrom in another portion of said evaporating section, and means for automatically preventing the flow of refrigerant into said complete section from the remainder of the system when the main circulation of refrigerant ceases.

2. In a refrigerating system, the combination of an evaporating section comprising two portions in series, one portion equipped with means for retaining liquid refrigerant distributively throughout and at a relatively higher level, and the other portion surrounded by a medium colder than surrounds the said first portion and at a relatively lower level, with inlet and outlet valves at the respective ends of the said section.

3. In a refrigerating system, the combination of a plurality of evaporating sections, dams in the individual pipes of one portion of an evaporating section, a cooling medium surrounding another portion of the same said evaporating section, an automatic liquid refrigerant feed valve connected to supply refrigerant to one end of said section, and a check valve in the exhaust from the other end of said section.

4. In an evaporating section of the low pressure side of a refrigerating system comprising a plurality of sections, the combination of traps placed in the pipes of one portion of said section, a medium of greater heat absorbing capacity surrounding another portion of same said section than that surrounding said first portion, the said first named portion being at a higher level than the second named portion, an automatic liquid admission valve in the inlet to the said first portion, and a check valve in the outlet from said second portion.

BENNET CARROLL SHIPMAN.